United States Patent [19]
McCalmont et al.

[11] Patent Number: 5,342,017
[45] Date of Patent: Aug. 30, 1994

[54] DAMPED CANTILEVERED SUPPORT ARM ASSEMBLY

[75] Inventors: Paul E. McCalmont, Cincinnati, Ohio; Richard A. Curless; Miles E. Loretta, Jr., both of Greer, S.C.

[73] Assignee: Cincinnati Milacron Inc., Cincinnati, Ohio

[21] Appl. No.: 954,527

[22] Filed: Sep. 30, 1992

[51] Int. Cl.$^5$ .................................................. F16M 13/00
[52] U.S. Cl. .................................. 248/632; 248/638; 248/634; 248/633
[58] Field of Search ............... 248/632, 633, 634, 638, 248/618, 562; 73/430

[56] References Cited

U.S. PATENT DOCUMENTS

| | | | |
|---|---|---|---|
| 2,442,754 | 6/1948 | Beam | 248/634 |
| 3,494,203 | 2/1970 | Efimenko et al. | 73/430 |
| 3,499,350 | 3/1970 | Hahn . | |
| 3,499,351 | 3/1970 | Jacobson . | |
| 3,522,864 | 8/1970 | Richter . | |
| 3,559,512 | 2/1971 | Aggarwal . | |
| 3,642,378 | 2/1972 | Hahn et al. . | |
| 4,438,599 | 3/1984 | Kamman et al. . | |
| 4,491,044 | 1/1985 | Haas et al. . | |
| 4,509,804 | 4/1985 | Klusman . | |
| 4,560,136 | 12/1985 | Basore | 248/638 |
| 4,560,289 | 12/1985 | Wood, III . | |
| 4,620,688 | 11/1986 | Khlafallah et al. | 248/638 |
| 4,664,536 | 5/1987 | Kamman . | |
| 4,764,033 | 8/1988 | Kohring et al. . | |
| 4,879,906 | 11/1989 | Meline et al. | 73/430 |
| 4,976,412 | 12/1990 | Simon et al. | 248/634 |
| 4,986,392 | 1/1991 | Komossa . | |
| 4,992,024 | 2/1991 | Heydrich . | |
| 5,033,340 | 7/1991 | Siefring . | |
| 5,178,357 | 1/1993 | Platus | 248/638 |
| 5,239,866 | 8/1993 | Froidevaux | 73/430 |

OTHER PUBLICATIONS

"Mechanisms of System Damping", Shock and Vibration Handbook, Harris and Crede, (McGraw-Hill Book Company, 1976) pp. 37-9-37-19.

Vanherck, "Dimensioning of Fluid Film Dampers", 1969, pp. 65-72.

Sommer, "Squeeze-Film Damping", May, 1966, pp. 163-166.

Aggarwal and Hasz, "Designing Optimum Dampers Against Self-Excited Chatter", *The American Society of Mechanical Engineers*, 1968, pp. 1-8.

Society for the Advancement of Material and Process Engineering, 36th International SAMPE Symposium and Exhibition, vol. 36, San Diego, Calif., Apr. 15-18, 1991, pp. 1-23.

*Primary Examiner*—Eugenia Jones
*Assistant Examiner*—Allan M. Schrock
*Attorney, Agent, or Firm*—Dinsmore & Shohl

[57] ABSTRACT

A damped, cantilevered support arm for a machine tool position monitoring device rigidly attached to the machine tool by a pair of spaced bolts for relative movement with a machine part along a longitudinal axis. The line of centers through the bolts is oriented along the longitudinal axis and the arm is mounted with shims located between its base and the machine tool part to allow limited effective freedom of movement of the support arm around the line of centers in a direction normal to the longitudinal axis. A squeeze-film damping chamber is provided between the spaced shims for reducing the response of the support arm in the normal direction during relative movement along the longitudinal axis. A boundary O-ring seal together with the thickness of the spacers, defines the damping chamber. Multiple degrees of freedom of movement and support arm response can also be accommodated by a stacked squeeze-film arrangement, wherein an oriented, rocking damper plate is sandwiched between the machine and support arm.

25 Claims, 3 Drawing Sheets

DAMPED CANTILEVERED SUPPORT ARM ASSEMBLY

TECHNICAL FIELD

This invention relates to damped, cantilevered support arm assemblies in general and, more particularly, to supports for monitoring devices, such as reader head/scale arrangements for high performance machine tools, wherein accurate positional monitoring of relatively movable parts is required. The cantilevered support arm assembly of the present invention provides greatly enhanced dynamic stiffness through the combination of damping structure and an attachment arrangment with unique static stiffness characteristics.

BACKGROUND OF THE INVENTION

In a variety of machine tools and other machinery applications, it is often critical to provide cantilevered supports for monitoring devices and the like which must be maintained at certain distances, and/or within predetermined tolerances relative to elements being monitored. For example, positioning scales and reader heads need precise mounting in order to accurately track positional changes of their respective support structures. For many sensitive monitoring devices, such as reader heads and scales, it is also imperative to minimize even momentary vibratory movements of the support arm assembly in order to prevent interruption of a dependable output signal train. The effectiveness of highly accurate monitoring and measuring devices can be drastically reduced or destroyed if supported in an unstable manner. Often such monitoring means are mounted on a machine part which is required to relatively move with respect to adjacent corresponding monitoring equipment. An example of such an arrangement would be a positional reader head which is attached for movement with a machine tool slide, and which must be consistently and reliably maintained in substantially vibration-free, close spacing with a monitoring scale attached to the machine tool slideway.

While damping of vibrations in machine tools or other machinery has been provided in a variety of ways over the years, many instability problems must be handled on a case by case basis, and reliable and simple solutions remain elusive in many circumstances. For example, a tuned vibration damper assembly for machine tools is shown in U.S. Pat. No. 3,522,864, which issued to R. C. Richter. Particularly, this patent shows the use of a tuned damping structure for eliminating vibrations in a rocking grinder wheel head arrangement, and contemplates the provision of its assembly on an angular face of the machine tool. A damper mass is connected to the machine tool on at least one viscoelastic damping element via a resilient bolt and spring assembly. Modal analysis of the machine tool geometry is used to determine the mounting angle of the damper mass in order to attenuate the horizontal and vertical components of the unwanted vibration in the tool. Conventional teachings in the industry also lead one to overcome vibrational problems of support structures by designing the structure as statically stiff as possible, and/or by hanging additional mass in strategic arrangements, such as shown in Richter '864. It has been found, however, that in applications where the machine tool arrangement is already relatively stiff, such conventional techniques are not always effective in addressing vibrational instabilities.

Other applications in the prior art in which damped structures have been successfully applied in machine tool environments include the tool turret shown in U.S. Pat. No. 4,491,044, which issued to R. G. Haas, et al. Particularly, Haas et al. teach the application of a squeeze-film damper to a cantilevered tool, wherein the tool extends from the face of a large plate which is attached about its inner edge to a machine base. A film damping chamber of relatively large cross-sectional area is created adjacent the bolt circle and sealed by a plurality of O-rings to provide a closed damping chamber between the spindle end face and the adjacent tool support plate. An oil film damper is also described in U.S. Pat. No. 4,764,033, which issued to Mark Kohring and Ed Bailey. Particularly, the '033 patent shows the provision of a rotator bearing shock and vibration dampener wherein a relatively thin oil damp well space is provided below the outer race of a turntable bearing and provided with limited inlets and outlets. The oil film tends to resist displacement thereby dampening vibrations and mechanical shocks often encountered in a robotic manipulator turntable bearing in use.

Another bearing mount utilizing a squeeze-film damping arrangement is shown in U.S. Pat. No. 4,509,804, which issued to S. Klusman. The Klusman bearing mount contemplates the use of a tubular bracket within which a high speed rotating shaft is to be housed, with one end of the bracket bolted to a base member within which a film damping chamber is provided. Radial deflection of the bracket housing manifests itself in the diaphragm spring portion of the tubular housing, causing local collapse of the squeeze-film chamber. The rotating shaft is thereby maintained in a concentric relationship with the central axis as a result of the resilient bracket. Other damping arrangements for reducing vibrational instabilities of cantilevered tools can be seen in U.S. Pat. Nos. 3,499,350 and 3,499,351. These patents pertain to the use of a viscous damper and a viscoelastic damper, respectively, applied to a cantilevered tool via a damper bar which extends from the tool base in a direction opposite to that of the tool and into a damping chamber.

While many of the above-referenced prior art teachings have been successfully employed in various machine tool applications and the like, most have been specifically designed for overcoming somewhat limited and particular problems in custom applications. Some of these structures, however, such as the Klusman bearing mount arrangement, are relatively complex, and, therefore, less preferred, especially for less complex and non-rotating situations. Consequently, heretofore there has remained a need for providing a simple yet widely adaptable damping assembly which can be used in a variety of cantilevered support arm assemblies without unduly complicating the structure and without substantially constraining performance of a machine tool monitoring device or the like.

DISCLOSURE OF THE INVENTION

It is an object of this invention to obviate the above-described problems and shortcomings of damped, cantilevered support arrangements heretofore available in the industry.

It is also an object of the present invention to provide a relatively simple and widely adaptable damping assembly which can be used in conjunction with cantilevered support arm assemblies without unduly complicating the structure and without constraining performance of the device.

It is yet another object of the present invention to provide a simple design for a damping assembly for cantilevered supports which can be easily adapted to arrangements requiring multi-directional damping, such as for complex movement or rotation, by stacking one or more damping plates adjacent the proximal end of the cantilevered member.

It is another object of the present invention to provide an improved damped cantilevered support arm for machine tools and the like which is operative to minimize even momentary vibratory movements of a support arm assembly and relatively moveable monitoring devices.

It is yet another object of the present invention to provide an improved cantilevered support arm assembly featuring enhanced dynamic stiffness as a result of a combination of a damping structure and an attachment arrangement having static stiffness characteristics which provide for limited movement in a predetermined direction.

In accordance with one aspect of the present invention, there is provided a damped, cantilevered support arm assembly for a monitoring device which is to be substantially rigidly attached to a machine tool structure or the like for relative movement with respect to another portion of such machine tool along a longitudinal axis of the machine. The assembly includes a support arm having proximal and distal ends, wherein the proximal end is attached along the longitudinal axis of the machine tool. In a preferred embodiment, a pair of attachment bolts pass through a corresponding pair of spacers in connecting the proximal end of the support arm to the machine tool, whereby limited movement of the cantilevered support arm is provided by those spacers in a direction substantially normal to the longitudinal axis. A damper is preferably located between the proximal end and the machine tool to reduce the response of the support arm to the limited normal movement which occurs during relative movement of the support arm and the other machine tool structure. The damper can preferably be provided in the form of a squeeze-film damping chamber, which is at least in part defined by a ring seal. In situations requiring damping of responses from relative motions along multiple axes, a second damper can preferably be located between the proximal end and the machine in the form of stacked dampers as described herein, wherein an additional damper plate is sandwiched between the proximal end and the machine tool structure to enable the superposition of a plurality of dampers provided in conjunction with spacers which enable limited effective movement along predetermined transverse axes.

BRIEF DESCRIPTION OF THE DRAWINGS

While the specification concludes with claims particularly pointing out and distinctly claiming the present invention, is believed the same will be better understood from the following description taken in conjunction with the accompanying drawings in which:

DETAILED DESCRIPTION OF THE INVENTION

Figure 1:
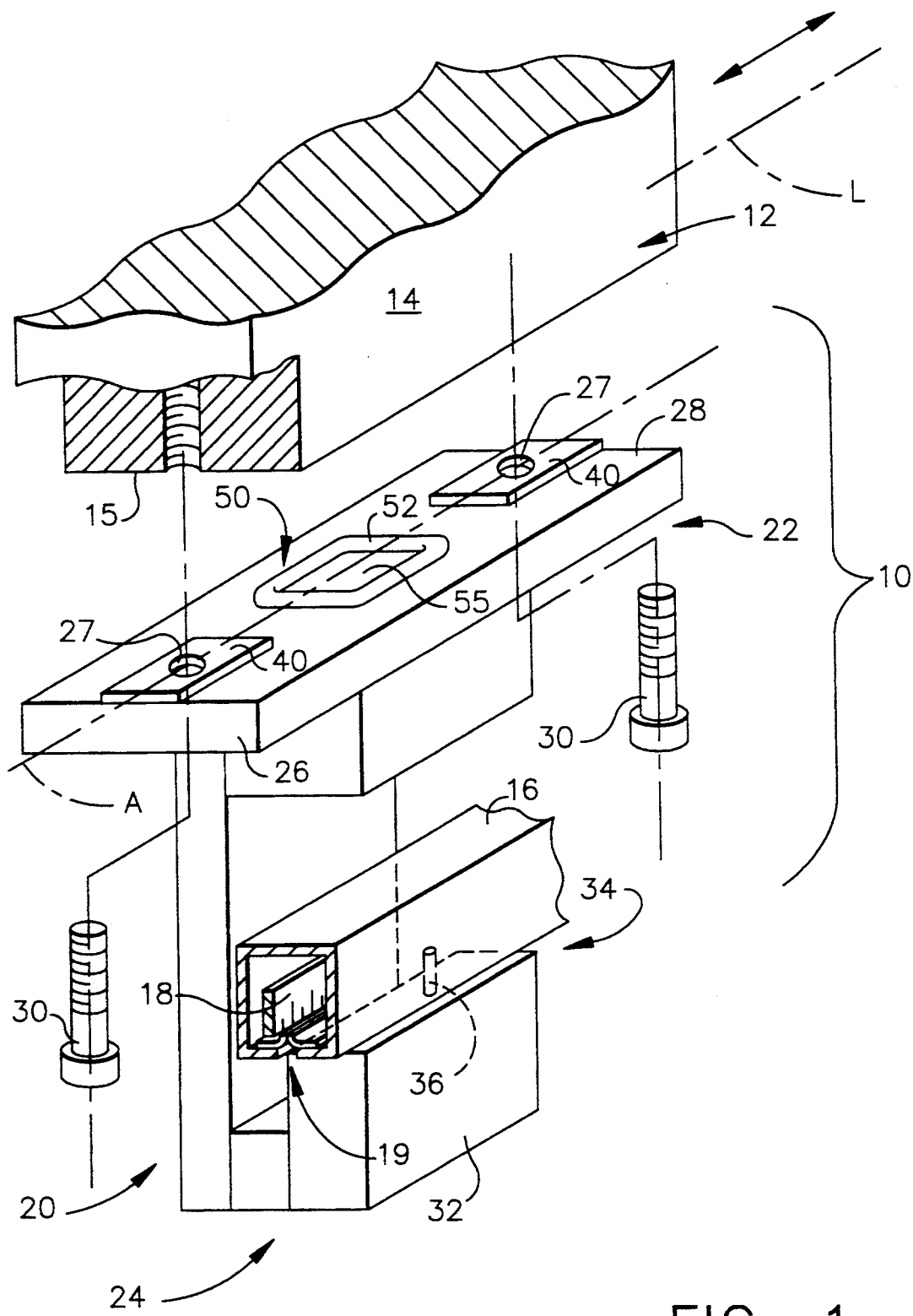
FIG. 1 is a partial, exploded perspective view of a damped, cantilevered support arm assembly made in accordance with the present invention.

Referring now to the drawings in detail, wherein like numerals indicate the same elements among the views, FIG. 1 illustrates a support arm assembly 10 contemplated for use with a monitoring device (e.g., reader head 36) which is to be substantially rigidly attached to a first structure 14 of a machine tool 12. It is contemplated that first structure 14 might be a slide mechanism of a machine tool, or a similar structure which undergoes relative movement with respect to a second structure (e.g., 16) during operation of the machine tool or similar device.

As discussed above, often it is essential that a monitoring device (e.g., reader head 36) be situated in such a way as to monitor positional changes resulting from relative movement along an axis (e.g., parallel to longitudinal axis L) of a device 12. The reader head 36/scale 18 arrangement is included only as an example of the various positional monitoring devices commonly utilized in the wide variety of machine tool and similar applications where precise positional changes resulting from relative movement among one or more axis is critical. In such an example, a monitoring scale (e.g. scale 18) might be attached to a machine tool slideway 17, wherein the positional reader head 36 must be consistently and reliably maintained in a substantially vibration-free, close spacing with respect to monitoring scale 18.

Support arm assembly 10 is illustrated as including a support arm 20 having a proximal end 22 and a distal end 24. Proximal end 22 may also preferably comprise a flange-like base member 26 having an upper surface 28. In a preferred embodiment, base member 26 would comprise a pair of spaced attachment bores 27 generally aligned along the line of centers (A) of attachment means (e.g., bolts 30) in use. Line A is substantially parallel with axis L. Adjacent distal end 24, a mounting block 32 is provided within attachment area 34 for receiving and supporting a monitoring device (e.g. 36).

As mentioned, monitoring scale 18, will be attached to a second structure. For simplicity, only a schematic depiction of a portion of the second structure has been illustrated in the form of a scale housing 16 which is connected to a portion of slideway 17 (See FIG. 2). A flexible opening 19 in the lower portion of housing 16 accommodates relative movement between scale 18 and reader head 36 in unencumbered fashion.

Focusing more closely on the connection between proximal end 22 of support arm 20 and first structure 14, it can be seen that means (e.g., shims or spacers 40) for enabling limited movement of support arm 20 in a direction substantially normal to longitudinal axis L are preferably provided adjacent attachment bores 27 formed through base 26, and preferably include holes corresponding with bores 27. As will be appreciated, spacers 40 can be provided in the form of shims of predetermined thickness (as illustrated in FIGS. 1 and 2), or alternatively can be provided in the form of protuberances (e.g., 142 of FIG. 3) aligned along the line of centers A of the respective attachment bores (e.g., 27, 127).

Figure 2:
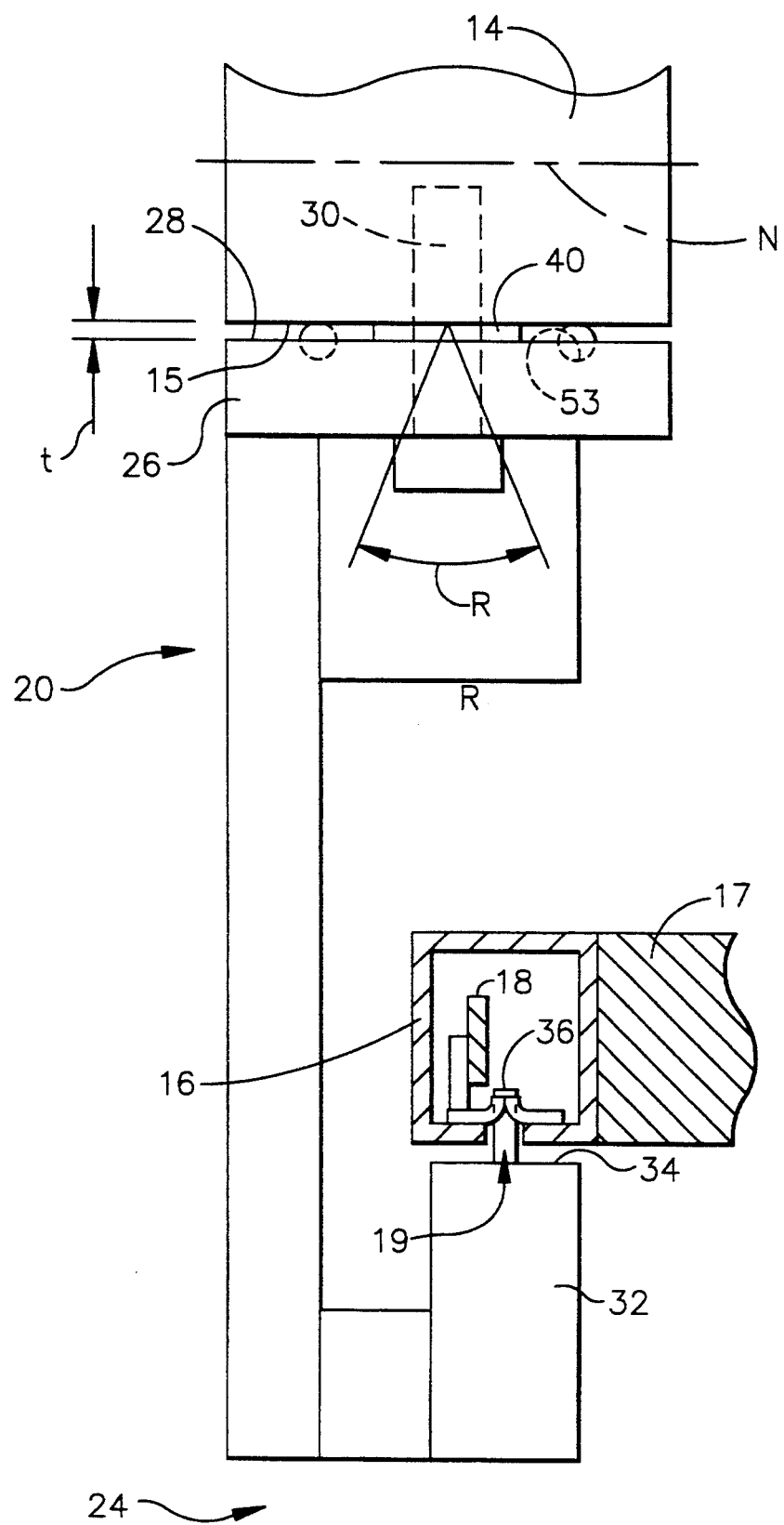
FIG. 2 is an end view of the support arm assembly of FIG. 2.

As best seen in FIG. 2, upon tightening of the support anchors or bolts 30, support arm 20 will be substantially rigidly attached at its proximal end 22 to first structure 14. Spacers 40, however, provide a predetermined gap thickness (t) between upper surface 28 of base member 26 and the lower or mounting surface 15 of first structure 14. This gap correspondingly reduces the effective area of contact between proximal end 22 and first structure 14 in a direction substantially normal (i.e., along axis N) to longitudinal axis L. Consequently, while proximal end 22 is substantially rigidly connected to first structure 14, this connection permits limited effective freedom of movement of support arm 20 in a direction substantially normal to longitudinal axis L. As depicted in FIG. 2, this limited freedom of movement manifests itself in the form of a relative "rocking" motion along a plane substantially normal to longitudinal axis L (as indicated by the arrow R). In this regard, while rigid connection is essential in a direction parallel with longitudinal axis L to ensure accurate monitoring of the relative positions of first and second structures 14 and 16, damping of the support arm's response to relative longitudinal motion is provided in directions substantially normal to such movement.

Damping of the response of support arm 20 to such relative movement is provided in the form of a damping means 50, as best seen in FIG. 1. Particularly, a preferred embodiment of damping means 50 comprises a squeeze-film damping chamber at least partially defined by an O-ring seal 52. A groove 53 may also be formed in upper surface 28 to help retain seal 52 in place during assembly and adjustment procedures, and to define the desired shape of the film area. Damping means 50 further comprises a damping medium 55 bounded within O-ring seal 52, with medium 55 preferably provided in the form of fluid, such as grease, having a viscosity range appropriate for the particular application involved. The choice of damping medium will, of course, be guided by temperature ranges contemplated and ranges of frequency responses to be damped. Damping means 50 will most preferably be provided in the form of damping medium materials with sufficiently high energy dissipation characteristics (e.g., loss modulus) corresponding to the application at hand. As seen in FIGS. 1 and 2, the area of damping means 50 will preferably extend beyond the width of spacers 40, i.e., in the direction of axis N, to attenuate the rocking motion (e.g., R) which might otherwise result.

As can be appreciated, the limited freedom of rocking movement as well as the film gap thickness "t" will be determined by the spacers, or shims 40. In one example, the gap and spacers 40 had a thickness of about 0.003 inches (0.08 mm). Such a shim thickness was utilized in a setup similar to that described in FIGS. 1 and 2 on a machine tool scale bracket. The damping medium placed within the O-ring seal was a lithium based EP grease, as available from Mobile Oil Company under the mark P-72, AW-1. While some static stiffness is sacrificed by providing for limited freedom of movement in a direction perpendicular to the axis of relative motion, dynamic stiffness of the system was greatly improved, as was accuracy and uniformity of the output signal train.

The reduced vibration of the reader head or similar monitoring device supported as described herein further tends to prevent potential premature failure of the monitoring equipment, mispositioning of the machine tool or other device, and tends to improve feedback in the system by reduction of unwanted signals or noise (i.e., improves signal to noise ratio). The simplicity of the structure further obviates the requirement for installation by highly skilled technicians, as bolt torque specifications represent the most demanding part of the installation procedure. The described set-up further improved performance without interfering or otherwise constraining operation of the machine tool and without the introduction of additional complexities and structures.

Figure 3:
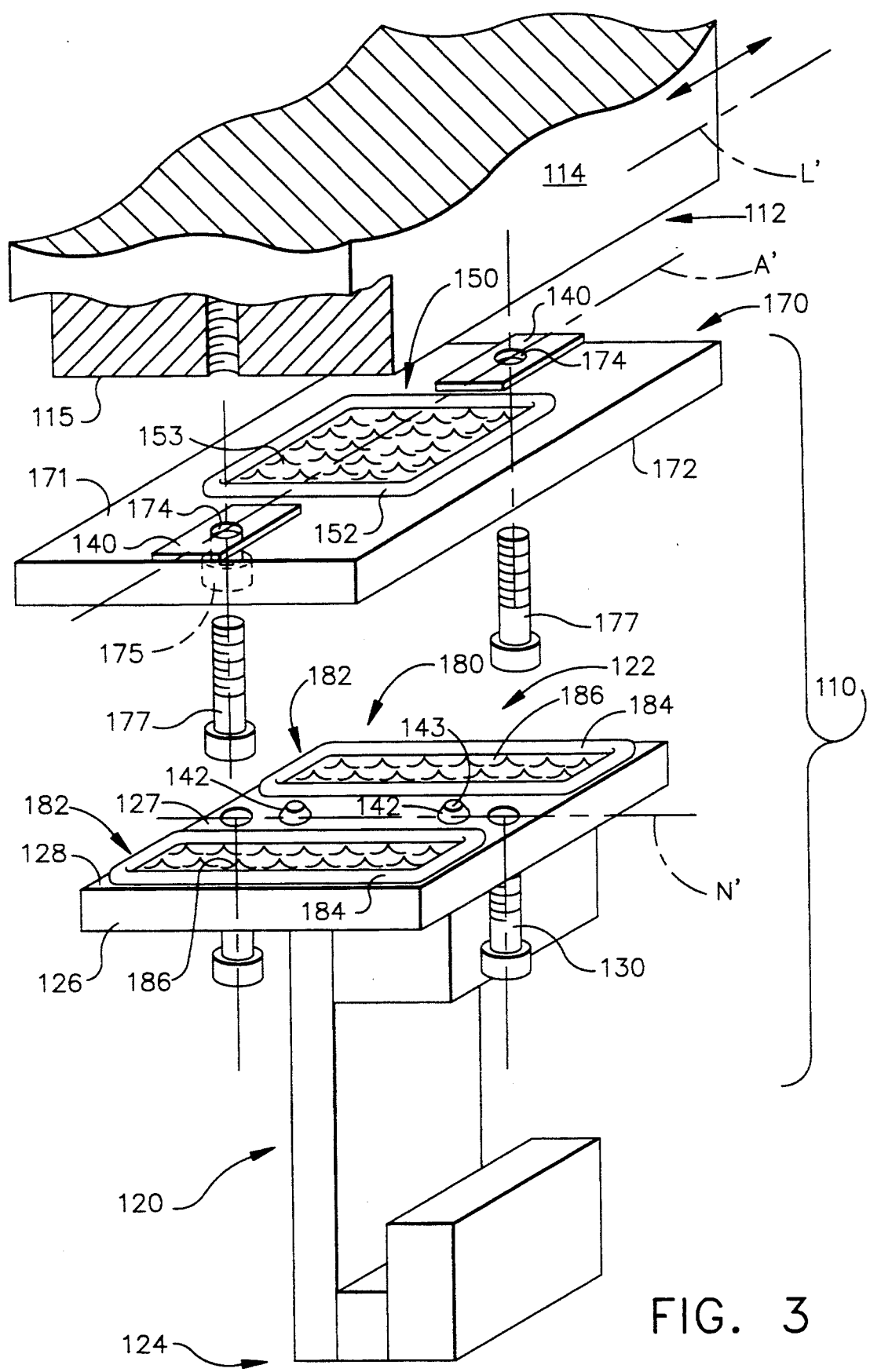
FIG. 3 is a partial, exploded view of an alternate embodiment of a cantilevered support arm assembly made in accordance with the present invention.

Turning now to FIG. 3, an alternate preferred embodiment of the present invention is illustrated for applications in which it is desired to provide damping along a plurality of crossed or transverse axes. Such an arrangement may be desirable in a situation where the relative motion between the first and second structures of a machine tool or other device comprises multi-directional components. Particularly, FIG. 3 illustrates a support arm assembly 110 substantially similar to assembly 10 described above, with the addition of a rigid damper plate 170 interposed between upper surface 128 of base member 126 and the lower mounting surface 115 of first structure 114.

The upper surface 171 of damper plate 170 is fitted with a damping means 150 virtually identical to that described above with respect to FIGS. 1 and 2. The lower surface 172 of damper plate 170 is preferably provided with counterbored surfaces 175 for accommodating attachment anchors/bolts 177 in a nonobtrusive manner. As will be appreciated, the limited freedom of movement provided by shims 140 will be in a direction normal to line of centers A'.

In order to provide limited freedom of movement and damping effects about a second and transverse axis (N'), a second damping means 180 is provided between the proximal end 122 of support arm 120 and damper plate 170. Particularly attachment bores 127 formed through base member 126 are aligned along axis N', in a direction transverse to line A'. As best seen in FIG. 3A, a plurality of modified spacers 142 are provided as means for enabling limited relative movement of cantilevered support arm 120 in a direction substantially parallel to longitudinal axis L' of the machine tool device 112. Modified spacers 142 are provided in the form of outwardly extending protuberances for providing an effective space between upper surface 128 and lower surface 172 of damper plate 170. While spacers 142 may include relatively planar top portions 143 for precise alignment, they will enable the predetermined effective rocking motion as described above with respect to spacers 40.

A second damping means 180 is disposed on opposite sides of axis N' in the form of a pair of squeeze-film damping chambers 182 each comprising damping fluid 186 bounded at least in part by O-rings 184. As will be appreciated, first damping means 150 and its axially aligned attachment anchors 177 provide for limited movement in a direction substantially normal to longitudinal axis L', and damping of support arm in response thereto; while second damping means 180 and its modified spacers 142 provide similar limited movement and damping of responses thereto in a direction parallel to axis L'.

It is further contemplated that any number of damping means could be provided in conjunction with a particular support arm assembly in order to accommodate a plurality of relative motion axes. In this regard, damper plates such as illustrated in FIG. 3 (e.g., plate 170) might be pre-formed with attachment bores, O-ring grooves, and/or spacer protuberances to accommodate particular applications and axes. These relatively modular packages could then be kept on hand for quick assembly for any of a variety of applications, and in any number of combinations to accommodate particular installations. In this respect, while motions along linear axes have been generally illustrated and described herein in the examples, it is contemplated that other multi-directional applications, such as circular scale/- reader head arrangements or the like, could be equally accommodated.

Having shown and described the preferred embodiments of the present invention, further adaptions of the damped, cantilevered support arm assembly of the present invention can be accomplished by appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

We claim:

1. A damped, cantilevered support arm assembly for a monitoring device which is to be substantially rigidly attached to a mounting surface of a first structure for relative movement with respect to a second structure along a longitudinal axis of a machine, said assembly comprising:
    a support arm having proximal and distal ends;
    means for rigidly attaching the proximal end of said support arm to said mounting surface of said first structure substantially parallel with said longitudinal axis;
    means for enabling limited movement of said cantilevered support arm in a direction substantially normal to said longitudinal axis; and
    a damper located adjacent said mounting surface of said first structure and between said proximal end and said first structure for reducing the response of said support arm to said limited movement during relative movement of said support arm and said second structure.

2. The support arm assembly of claim 1, wherein said attaching means comprises a pair of support arm anchors spaced from one another along said longitudinal axis.

3. The support arm assembly of claim 1, wherein said means for enabling limited movement comprises a pair of spacers aligned along said longitudinal axis.

4. The assembly of claim 3, wherein said spacers are provided in the form of shims.

5. The assembly of claim 3, wherein said spacers are provided in the form of protuberances spaced from one another along said longitudinal axis and extending outwardly from said proximal end.

6. The assembly of claim 1, wherein said damper comprises a squeeze-film damping chamber.

7. The assembly of claim 6, wherein said damping chamber is at least partially defined by a ring seal between said proximal end and said first structure.

8. The assembly of claim 1, further comprising a second damper located between said proximal end and said first structure, said second damper being aligned generally parallel with said longitudinal axis for reducing the response of said support arm to relative movement along said longitudinal axis.

9. The assembly of claim 8, wherein said dampers are provided in the form of stacked viscous dampers, wherein one of the dampers is located between said proximal end and a damper plate sandwiched between the proximal end and the first structure, and the other damper is located between the damper plate and said first structure.

10. A damped, cantilevered support arm assembly for a monitoring device which is to be substantially immovably attached to a mounting surface of a first structure of a machine for relative movement with respect to a second structure along a longitudinal axis of the machine, said support arm assembly comprising:
    a cantilevered support arm having a proximal end and a distal end;
    means for substantially rigidly attaching said proximal end to said mounting surface of said first structure, said attaching means permitting limited effective freedom of movement of said support arm in a direction substantially normal to said longitudinal axis; and
    damping means attached to said support arm and adjacent said mounting surface between said proximal end and said first structure for reducing the response of said support arm to movement in a direction normal to said movement along said longitudinal axis.

11. The assembly of claim 10, wherein said damping means comprises a damper located between said proximal end and said first structure.

12. The assembly of claim 11, wherein said damping means comprises a squeeze-film damping chamber located between said proximal end and said first structure.

13. The assembly of claim 11, wherein said damper comprises viscous material for damping movement response of said support arm.

14. A damped, cantilevered support arm assembly for a monitoring device which is to be substantially immovably attached to a mounting surface of a first structure of a machine for relative movement with respect to a second structure of such machine along a longitudinal axis thereof, said support arm assembly comprising:
    a cantilevered support arm having a proximal end and a distal end, said proximal end comprising a base member;
    means for substantially rigidly attaching said base member to said mounting surface of said first structure for relative movement therewith along a longitudinal axis thereof;
    means for permitting limited effective freedom of movement of said support arm in a direction normal to said longitudinal axis;
    an attachment area located adjacent said distal end of said support arm and spaced from said base member for receiving and supporting said monitoring device; and
    damping means located adjacent said mounting surface and between said proximal end of said support arm and said first structure for reducing the response of said support arm to movement in a direction normal to said relative movement along said longitudinal axis.

15. The assembly of claim 14, wherein said damping means comprises a squeeze-film damping chamber located between said base member and said machine.

16. The assembly of claim 14, wherein said means for permitting limited movement comprises a plurality of shims located between said base member and said first structure, said shims permitting predetermined effective movement of said support arm relative to said machine in a direction substantially normal to said longitudinal axis.

17. The assembly of claim 15, wherein said damping chamber is bounded by a ring seal mounted adjacent said base member.

18. The assembly of claim 16, wherein said damping means comprises a squeeze-film damping chamber located between said base member and said first structure, and said shims determine a film gap within said damping chamber while permitting limited effective freedom of movement in a direction normal to said longitudinal axis.

19. A damped reader head support arm assembly for use with a machine wherein accurate positional monitoring of movable parts is required and wherein a monitoring means must be situated to monitor positional changes resulting from relative movement along a longitudinal axis of said machine, said support arm assembly comprising:
- a cantilevered support arm having a proximal end and a distal end;
- a base member connected to said support arm adjacent said proximal end;
- means for attaching said base member to said machine and for providing substantial rigidity of said cantilevered support arm in a direction substantially parallel with said longitudinal axis;
- a plurality of shims located between said base member and said machine to provide limited effective freedom of movement of said support arm in a direction substantially normal to said longitudinal axis; and
- damping means mounted adjacent said base member for reducing the response of said support arm to movement in a direction normal to said movement along said longitudinal axis.

20. The assembly of claim 19, wherein said base member comprises an upper surface which is attached adjacent said first structure of said machine in use, and wherein said damping means comprises a squeeze-film damping chamber located between said upper surface and said first structure when attached.

21. The assembly of claim 20, wherein said damping chamber is at least partially defined by an O-ring member.

22. The assembly of claim 19, wherein said damping means comprises a pair of damping arrangements, wherein one of said arrangements is aligned substantially along said longitudinal axis and designed to damp movement of said support arm in the direction of said longitudinal axis, while the other arrangement is aligned substantially normal to said longitudinal axis and dampens movement in the direction normal to said longitudinal axis.

23. The assembly of claim 22, wherein said attaching means comprises a pair of anchor bolts spaced along said longitudinal axis, one of said shims is captively associated with each anchor bolt.

24. A damped, cantilevered support arm assembly for a monitoring device which is to be substantially rigidly attached to a mounting surface of a first structure for relative movement with respect to a second structure along a longitudinal axis of a machine, said assembly comprising:
- a cantilevered support arm having a proximal end and a distal end;
- a base member connected to said support arm adjacent said proximal end;
- means for attaching said base member to the mounting surface of said first structure and for providing substantial rigidity of said cantilevered support arm in a direction substantially parallel with said longitudinal axis;
- a plurality of shims located between said base member and said first structure to provide limited effective freedom of movement of said support arm in a direction substantially normal to said longitudinal axis; and
- damping means mounted adjacent said base member for reducing the response of said support arm to movement in a direction normal to said movement along said longitudinal axis.

25. The assembly of claim 24, wherein said base member comprises an upper surface which is attached adjacent said first structure in use, and wherein said damping means comprises a squeeze-film damping chamber located between said upper surface and said first structure in use.

* * * * *